United States Patent [19]
Elton et al.

[11] Patent Number: 5,996,439
[45] Date of Patent: Dec. 7, 1999

[54] BRAKE PEDAL MECHANISM

[75] Inventors: Robert Douglas Elton, Ann Arbor; Michael Joseph McKale, Troy, both of Mich.

[73] Assignee: General Motors Corporation, Detroit, Mich.

[21] Appl. No.: 09/120,609

[22] Filed: Jul. 22, 1998

[51] Int. Cl.[6] .............................. G05G 1/14; B60K 17/30; B60K 28/10
[52] U.S. Cl. ................................ 74/512; 74/513; 74/560; 180/274; 180/255
[58] Field of Search ........................... 74/512, 513, 560; 180/274, 255

[56] References Cited

U.S. PATENT DOCUMENTS

| | | |
|---|---|---|
| 3,631,739 | 1/1972 | McArthur . |
| 3,643,524 | 2/1972 | Herring . |
| 3,643,525 | 2/1972 | Gibas . |
| 3,828,625 | 8/1974 | Bruhn, Jr. . |
| 3,975,972 | 8/1976 | Muhleck ............................. 74/512 X |
| 4,546,667 | 10/1985 | Bopst, III . |
| 4,870,871 | 10/1989 | Ivan . |
| 4,875,385 | 10/1989 | Sitrin . |
| 5,010,782 | 4/1991 | Asano et al. . |
| 5,056,742 | 10/1991 | Sakurai . |
| 5,078,024 | 1/1992 | Cicotte et al. . |
| 5,086,663 | 2/1992 | Asano et al. . |
| 5,351,573 | 10/1994 | Cocotte . |
| 5,460,061 | 10/1995 | Redding et al. . |
| 5,497,677 | 3/1996 | Baumann et al. . |
| 5,771,752 | 6/1998 | Cicotte ...................................... 74/512 |

FOREIGN PATENT DOCUMENTS

4409324-A1  3/1994  Germany ................. 180/274

*Primary Examiner*—Tamara L. Graysay
*Assistant Examiner*—Colby Hansen
*Attorney, Agent, or Firm*—Kathryn A. Marra

[57] ABSTRACT

A brake pedal mechanism limits the reaction force applied on a brake pedal lever pivot. The pivot is formed by a slot closed by a tang yieldably connected to a retaining arm of a pivotable release lever. A release arm of the release lever is engagable by an actuating rod of a brake booster when moved beyond the normal travel limit of the rod. In one case, excessive brake pedal force causes the tang to yield and release the brake pedal pivot pin. In another case, excess rearward motion of the actuating rod pivots the release lever, lifting the tang and freeing the pivot pin. In either case, the reaction force on the pivot is maintained below a desired limit.

7 Claims, 2 Drawing Sheets

BRAKE PEDAL MECHANISM

TECHNICAL FIELD

This invention relates to brake pedal mechanisms for vehicles and more particularly to a brake pedal mechanism incorporating means for limiting the maximum reaction force on a brake pedal arm pivot.

BACKGROUND OF THE INVENTION

Under certain abnormal operating conditions of an automotive vehicle, excessive reaction force may be applied against the pivot of a brake pedal lever, either through rearward motion of a brake actuating rod connected with the lever or through the application of excessive force on the brake pedal itself.

SUMMARY OF THE INVENTION

The present invention provides a brake pedal mechanism in which a brake pedal lever is pivoted on brake pivot means received in a rear pivot formed by a rearwardly extending slot. A release lever connected with a front pivot includes a retaining arm having a tang projecting behind the brake pivot means to normally retain the brake pivot means in a fixed pivot position. The pedal lever connects with brake actuating means including a brake actuator which is also engagable with a release arm of the release lever.

Upon excessive rearward motion of the brake actuator, the release lever will be pivoted upward, removing the tang from behind the brake lever pivot and releasing the pivot from absorbing further reaction force. Alternatively, upon the application of excessive force against a brake pedal on the pedal lever, breakaway means, such as a notch at the mounting point of the tang to the release lever, will yield, freeing the brake pivot means from restraint by the tang and thereby also limiting the maximum force that may be applied to the pivot.

These and other features and advantages of the invention will be more fully understood from the following description of certain specific embodiments of the invention taken together with the accompanying drawings.

DESCRIPTION OF THE PREFERRED EMBODIMENT

Figure 1:
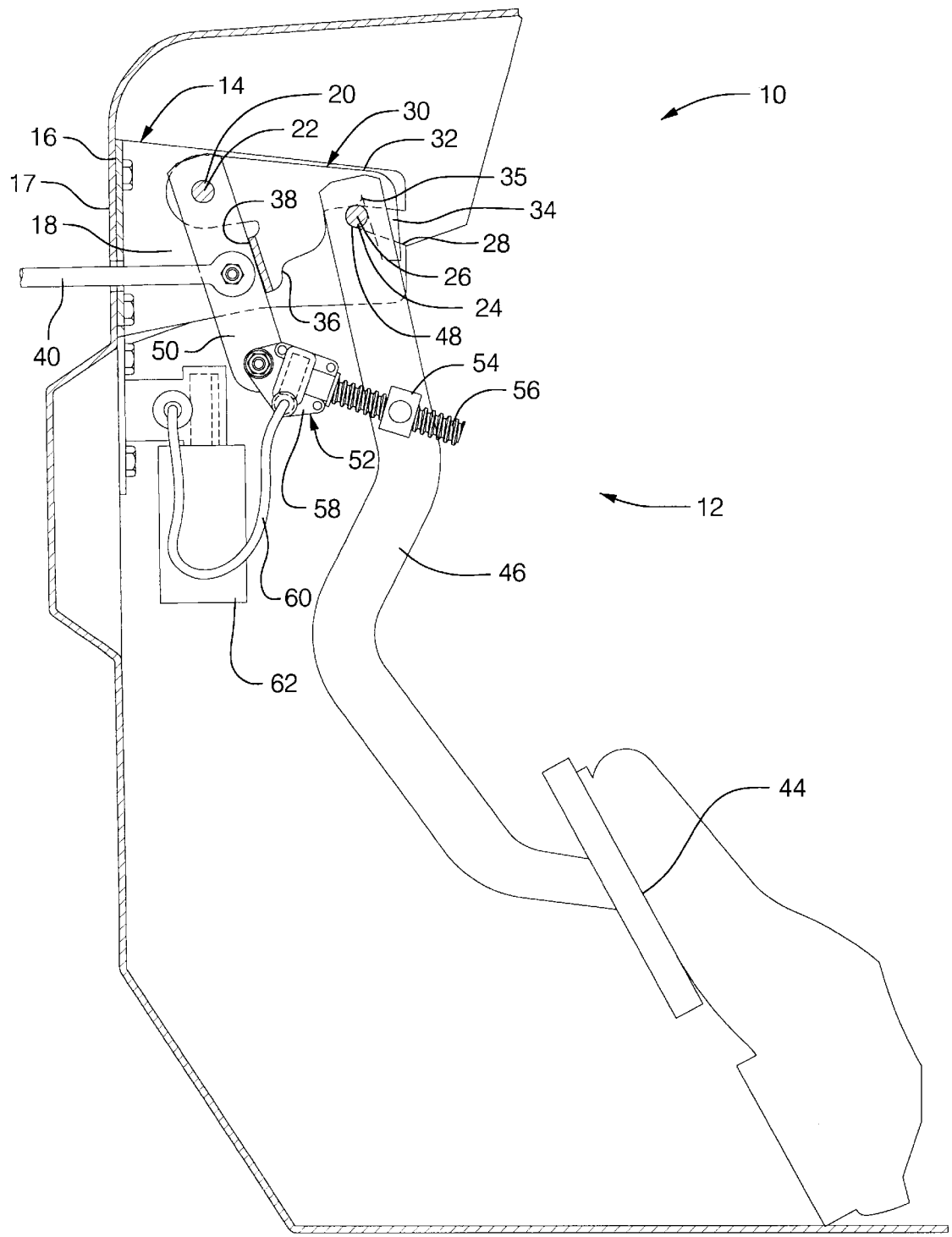
FIG. 1 is a schematic side view illustrating a first embodiment of brake pedal mechanism formed in accordance with the invention.

Referring first to FIG. 1 of the drawings in detail, numeral 10 generally indicates an automotive vehicle including a brake pedal mechanism generally indicated by numeral 12. Mechanism 12 illustrates an application of the invention to an adjustable brake pedal mechanism that provides for adjustment of the operating position of the brake pedal between forward and rearward operating positions in a vehicle.

Figure 2:
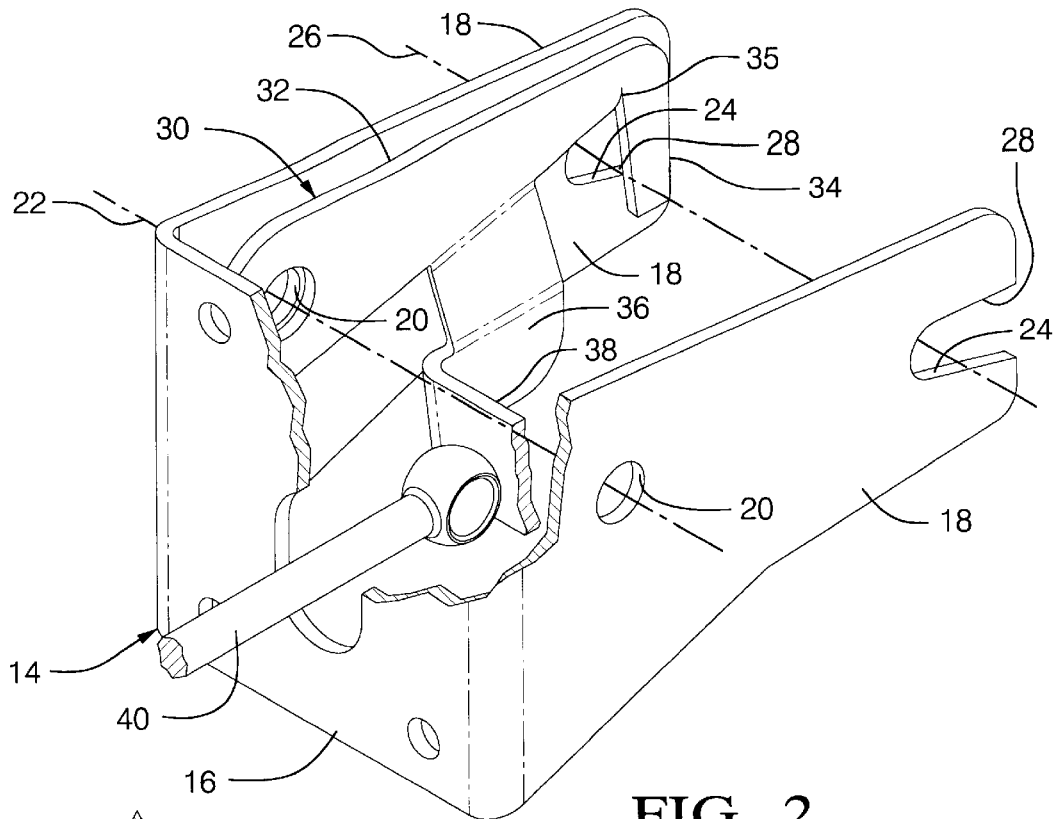
FIG. 2 is a pictorial view of the support bracket and release lever assembly shown in the embodiment of FIG. 1.

Brake pedal mechanism 12 preferably includes a mounting bracket 14 best shown in FIG. 2. Bracket 14 has a front wall 16 mountable against a mounting wall 17 of a vehicle passenger compartment. The bracket 14 further includes laterally spaced side walls 18 including openings defining front pivots 20 having a pivot axis 22 and rear pivots 24 having a pivot axis 26. The openings defining the rear pivots 24 include rearwardly extending slots 28 which are open at the rear ends of the bracket side walls 18.

A release lever 30 is mounted to the front pivots for pivotal motion about the front pivot axis 22. Lever 30 includes a pair of retaining arms 32, one of which is shown. Arms 32 extend rearward and terminate in downwardly extending tangs 34 which, in their normal positions, extend across the slots 28 to close their rear portions so as to form closed rear pivots 24. Breakaway notches 35 are provided at the connection of the tangs 34 with arms 32. Release lever 30 farther includes downwardly extending release arms 36 which are connected by a contact portion 38. The contact portion 38 is positioned to be engaged, in assembly, either directly or indirectly by the actuating rod 40 of a brake booster, not shown, mounted on a front wall 16 of the vehicle passenger compartment.

Rearward motion of the actuating rod 40, beyond its normal rearward position when the brake is released, will cause the actuating rod 40, or an extension thereof, to engage the contact portion 38 of the release arms 36 and pivot the release lever 30 counterclockwise so that the tangs 34 are lifted upwardly out of alignment with the slots 28. This opens the rear sides of the rear pivots 24.

The release lever 30 is only one example of a lever that may be applied to the form of adjustable brake pedal mechanism 12 shown in FIG. 1. Mechanism 12 includes a foot pedal 44 connected to a brake arm 46 extending upward to pivot means 48. The pivot means 48 may take the form of a pivot pin retained in the rear pivots 24 defined by the front portion of the slots 28. The pivot means 48 pin may be a separate element or may form part of the brake pedal arm 46 as desired.

Brake pedal mechanism 12 further includes a slave lever 50 pivotally mounted on the front pivots 20 of the bracket 14. The slave lever 50 directly connects with the actuating rod 40 of the brake booster. A connecting link 52 and adjusting nut 54 connect the brake arm 46 intermediate its ends with the slave lever 50 for moving the slave lever 50 to actuate the rod 40 when the foot pedal 44 is depressed by an operator of the vehicle. Adjusting nut 54 is threadably connected with a screw 56 which is rotatable by a gear box 58 driven through a cable 60 by a motor drive 62. This mechanism 12 makes the connecting link 52 adjustable to vary the distance between the brake arm 46 and the slave lever 50 in order to position the foot pedal 44 in a range of normal operating positions to accommodate operators having various length legs.

In operation, application of the brake pedal 12 by an operator's foot against the pedal 44 pivots the brake arm 46 clockwise around its pivot axis 26, causing the link 52 to drive the slave lever 50 clockwise and move the actuating rod 40 toward the brake application position of the brake booster, not shown. Should an abnormal condition cause an excessive force against the foot pedal 44, the reaction force on the pivot means 48 will cause the tangs 34 to break away or yield at the notched breakaway portions 35. This will allow the pivot means 48 to slide rearward in the slots 28 out of the normal pivot location and prevent the application of excessive force against the brake arm pivot means 48.

Should another abnormal condition occur wherein the brake booster with its actuating rod 40 is forced rearwardly in the vehicle, the rod 40 will contact portion 38 of the release lever 30, causing the release arms 36 to move counterclockwise and lift the tangs 34 out from behind the pivot means 48 of the brake arm 46. Thus, the pivot means 48 will be released and allowed to slide rearwardly out of the slots 28, preventing the application of excessive force against the pivot means 48 by reason of the rearward movement of the brake booster.

Figure 3:
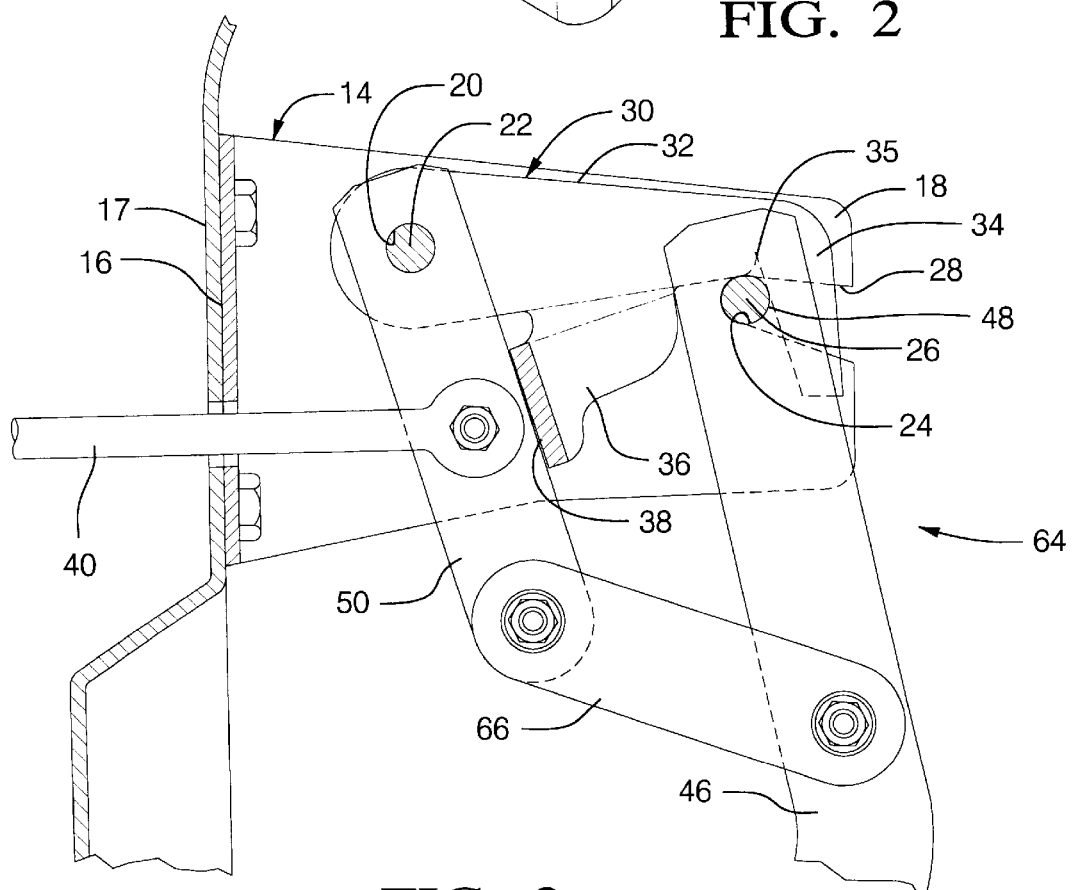
FIG. 3 is a fragmentary side view showing a portion of an alternative brake pedal mechanism embodying the invention.

Referring now to FIG. 3 of the drawings, there is shown a portion of a non-adjustable brake pedal mechanism 64 having a solid link 66 connecting the brake arm 46 with the slave lever 50. In this mechanism 64, which is otherwise similar to mechanism 12, the features of the present invention are applied to a brake pedal mechanism 64 which is not provided with the pedal adjustment feature of the first described embodiment.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

We claim:

1. A brake pedal mechanism for an automotive vehicle, said mechanism comprising:

a support having front and rear pivots longitudinally spaced on laterally extending parallel axes, said rear pivot defined by a rearwardly extending slot;

a pedal lever having upper and lower ends, said upper end being connected with said rear pivot by pivot means received in said slot, the pedal lever being pivotable about said pivot means between forward and rear actuating positions, said lower end mounting a foot pedal;

a release lever pivotally connected with said front pivot and having a retaining arm extending radially from said front pivot, said retaining arm extending adjacent to said rear pivot and including a tang projecting behind said pivot means and normally retaining the pivot means in a forward position in said slot to fix the location of the rear pivot for the pedal lever;

actuating means connected between the pedal lever intermediate said upper and lower ends and a brake actuator for applying a vehicle brake upon the application of force by an operator's foot acting against the foot pedal, a reaction force on the pedal lever being applied against the pivot means retained by the tang of the retaining arm; and release means for releasing said tang from behind said pivot means upon one of (a) the application of a predetermined reaction force of the pivot means against said tang and (b) substantial rearward motion of the brake actuator relative to the front pivot.

2. A brake pedal mechanism as in claim 1 wherein said release means includes breakaway means connecting said tang with said retaining arm, said breakaway means being yieldable upon the application of a predetermined reaction force of the pivot means against said tang to release said tang from further restraining rearward motion of the pivot means in the slot to thereby release the brake pedal and limit the maximum force able to be applied on the brake pedal.

3. A brake pedal mechanism as in claim 1 wherein said release means includes a release arm on said release lever and extending radially from said front pivot, said release arm being operatively engagable by said brake actuator upon excessive rearward motion of the brake actuator, such motion pivoting said release lever to remove said tang from behind said pivot means and allow rearward motion of the pivot means in the slot to thereby release the brake pedal and limit the maximum force able to be applied on the brake pedal.

4. A brake pedal mechanism as in claim 1 wherein said actuating means are adjustable to vary the length of the actuating means connected between the pedal lever and the brake actuator to vary the pivotal position of the pedal lever and thereby adjust the fore and aft location of the brake pedal.

5. A brake pedal mechanism as in claim 4 wherein said actuating means include: a slave lever pivotally mounted on the axis of said front pivot and connected with said brake actuator, and an adjustable link pivotally connected between the pedal lever and said slave lever.

6. A brake pedal mechanism as in claim 5 wherein said release means includes breakaway means connecting said tang with said retaining arm, said breakaway means being yieldable upon the application of a predetermined reaction force of the pivot means against said tang to release said tang from further restraining rearward motion of the pivot means in the slot to thereby release the brake pedal and limit the maximum force able to be applied on the brake pedal.

7. A brake pedal mechanism as in claim 5 wherein said release means includes a release arm on said release lever and extending radially from said front pivot, said release arm being operatively engagable by said brake actuator upon excessive rearward motion of the brake actuator, such motion pivoting said release lever to remove said tang from behind said pivot means and allow rearward motion of the pivot means in the slot to thereby release the brake pedal and limit the maximum force able to be applied on the brake pedal.

* * * * *